United States Patent [19]

Mori et al.

[11] Patent Number: 4,809,865
[45] Date of Patent: Mar. 7, 1989

[54] FUEL TANK FOR USE IN A VEHICLE

[75] Inventors: Eiji Mori, Okazaki; Hidefumi Sonoda, Toyota; Akira Hiraku; Isao Katoh, both of Okazaki; Kouichi Itoh, Tajimi; Morio Minezawa, Okazaki, all of Japan

[73] Assignee: Toyota Jidosha Kabushiki Kaisha, Aichi, Japan

[21] Appl. No.: 151,491

[22] Filed: Feb. 2, 1988

[30] Foreign Application Priority Data

Feb. 20, 1987 [JP] Japan .............................. 62-22884[U]
Feb. 20, 1987 [JP] Japan .................................. 62-35818
Feb. 23, 1987 [JP] Japan .............................. 62-24081[U]

[51] Int. Cl.⁴ .............................................. B65B 31/06
[52] U.S. Cl. .............................. 220/86 R; 220/85 VS; 220/85 VR; 220/85 S; 123/519
[58] Field of Search ............ 220/85 VS, 85 VR, 85 S, 220/86 R; 123/518, 519

[56] References Cited

U.S. PATENT DOCUMENTS

| | | | |
|---|---|---|---|
| 4,572,394 | 2/1986 | Tanahashi et al. | 220/86 R |
| 4,630,749 | 12/1986 | Armstrong et al. | 220/86 R |
| 4,632,270 | 12/1986 | Sasaki et al. | 220/86 R |
| 4,651,889 | 3/1987 | Uranishi et al. | 220/85 VR |
| 4,701,198 | 10/1987 | Uranishi et al. | 55/387 |
| 4,715,509 | 12/1987 | Ito et al. | 220/86 R |
| 4,765,504 | 8/1988 | Sherwood | 220/86 R |

FOREIGN PATENT DOCUMENTS

| | | |
|---|---|---|
| 27955 | 2/1986 | Japan . |
| 90624 | 6/1986 | Japan . |
| 93320 | 6/1986 | Japan . |
| 141127 | 9/1986 | Japan . |
| 29418 | 2/1987 | Japan . |
| 29419 | 2/1987 | Japan . |
| 31779 | 2/1987 | Japan . |

Primary Examiner—Stephen Marcus
Assistant Examiner—Gil Reece
Attorney, Agent, or Firm—Parkhurst, Oliff & Berridge

[57] ABSTRACT

A fuel tank having a fuel inlet pipe which has a normally closed closure valve arranged therein and opened by a fuel pump nozzle. A valve housing is fixed onto the outer wall of the fuel inlet pipe. A cam and a normally closed control valve actuated by the cam and controlling the fluid connection between the canister and the interior of the fuel tank are arranged in the valve housing. The cam shaft of the cam is mechanically connected to the rotary shaft of the closure valve. When the closure valve is opened by the fuel pump nozzle, the control valve is opened by the cam to feed the fuel vapor in the fuel tank into the canister.

19 Claims, 7 Drawing Sheets

FUEL TANK FOR USE IN A VEHICLE

BACKGROUND OF THE INVENTION

1. Field of the Invention

The present invention relates to a fuel tank for use in a vehicle.

2. Description of the Related Art

A vehicle driven by an internal combustion engine is normally equipped with a fuel tank. In such a vehicle, when the amount of fuel in the fuel tank is to be replenished, a cap attached to a fuel inlet of the fuel tank is removed, a fuel pump nozzle is inserted into the fuel inlet, and fuel is fed into the fuel tank from the fuel pump nozzle. However, when the amount of fuel in the fuel tank is small, the space above the liquid surface of the fuel in the fuel tank is filled with a large amount of fuel vapor under pressure. Consequently, when the cap attached to the fuel inlet is removed, the fuel vapor flows out from the fuel inlet into the outside air, causing air pollution. In addition, when the fuel is fed into the fuel tank from the fuel pump nozzle, the fuel spouted from the fuel pump nozzle comes into violent contact with and agitates the fuel in the fuel tank, causing a large amount of fuel vapor to be generated in the fuel tank. As a result, the fuel vapor gradually flows into the outside air as the liquid surface of fuel in the fuel tank is raised, also causing air pollution.

To prevent this air pollution, a fuel tank is known in which a normally closed closure valve, which is opened when the fuel pump nozzle is inserted into the fuel inlet, is pivotally arranged in the fuel inlet pipe, and a normally closed control valve is also arranged in the fuel inlet pipe to control the flow of fuel vapor flowing from the fuel tank towards a fuel vapor purifying device. When the closure valve is opened, the control valve is also opened, and thus the fuel vapor in the fuel tank is fed into a fuel vapor purifying device (Japanese Unexamined Utility Model Publication No. 61-90624).

In addition, to prevent such air pollution, another fuel tank has been proposed in which a normally closed closure valve, which is opened when the fuel pump nozzle is inserted into the fuel inlet, is pivotally arranged in the fuel inlet pipe, and a normally closed control valve is also pivotally arranged in the fuel inlet pipe to control the flow of fuel vapor flowing from the fuel tank towards a fuel vapor purifying device. When the closure valve is opened, the control valve is also opened, and thus the fuel vapor in the fuel tank is fed into the fuel vapor purifying device (Japanese Utility Model Application No. 60-169614).

However, the cross-sectional area of the fuel inlet pipe is small, and thus, when the control valve is arranged in the fuel inlet pipe in addition to the closure valve, a problem occurs in that the mounting of the control valve is difficult. In addition, it is necessary to arrange the control valve so that it does not obstruct the fuel pump nozzle when inserted into the fuel inlet pipe, and thus another problem occurs in that it is impossible to give the control valve a large enough fuel vapor flow area.

SUMMARY OF THE INVENTION

An object of the present invention is to provide a fuel tank in which the control valve can be easily mounted in the fuel inlet pipe and a large enough fuel vapor flow area can be given to the control valve.

According to the present invention, there is provided a fuel tank having therein an interior chamber connected to a fuel vapor purifying device, comprising: a fuel inlet pipe; a rotary shaft rotatably supported within the fuel inlet pipe; a closure valve fixed to the rotary shaft and normally closing a cross-section of the fuel inlet pipe, the closure valve being arranged to come into contact with a fuel pump nozzle and rotating to open when the fuel pump nozzle is inserted into the fuel inlet pipe; a valve housing fixed onto an outer wall of the fuel inlet pipe; a control valve pivotally supported within the valve housing to control the fluid connection between the fuel vapor purifying device and the interior chamber of the fuel tank, the control valve normally disconnecting the interior chamber of the fuel tank from the fuel vapor purifying device; and a cam shaft rotatably arranged in the valve housing and connected to the rotary shaft to rotate together with said rotary shaft, the cam shaft having a cam which actuates the control valve to establish a fluid connection between the fuel vapor purifying device and the interior chamber of the fuel tank when the closure valve is open.

The present invention may be more fully understood from the description of the preferred embodiments of the invention set forth below, together with the accompanying drawings.

DESCRIPTION OF THE PREFERRED EMBODIMENTS

Figure 1:
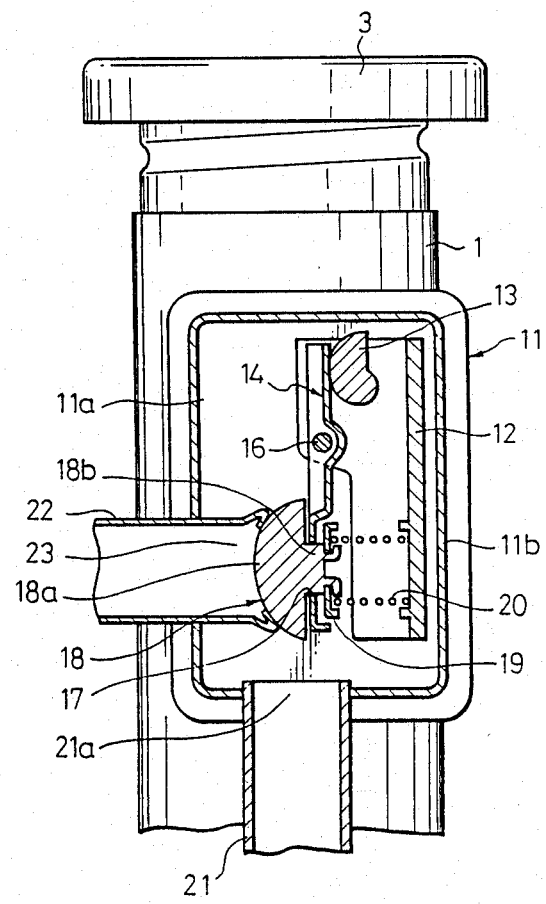
FIG. 1 is a cross-sectional side view of a valve housing, taken along the line I—I in FIG. 2.
Figure 2:
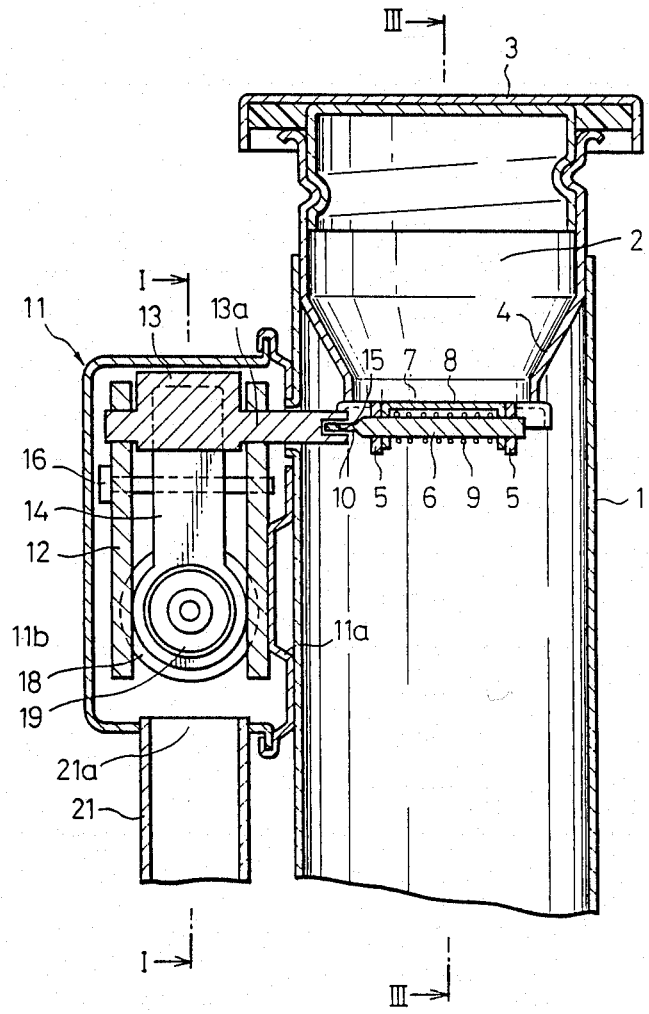
FIG. 2 is a cross-sectional view of a fuel inlet pipe, taken along the line II—II in FIG. 3.
Figure 3:
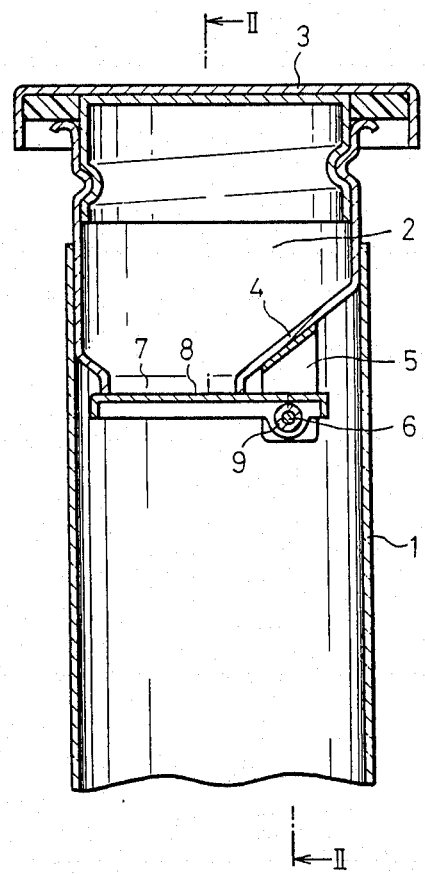
FIG. 3 is a cross-sectional view of the fuel inlet pipe, taken along the line III—III in FIG. 2.
Figure 4:
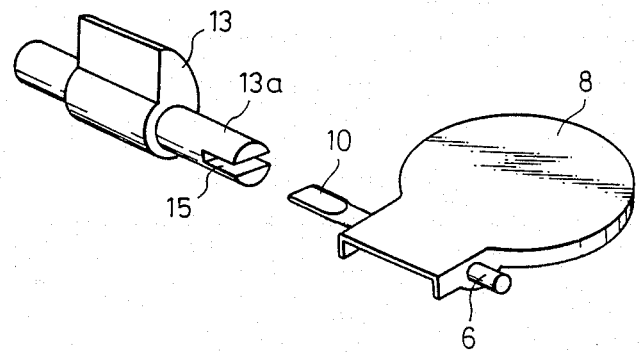
FIG. 4 is a perspective view of the cam and the closure valve.

Referring to FIGS. 1 through 4, reference numeral 1 designates a fuel inlet pipe of a fuel tank, 2 a fuel inlet, 3 a cap screwed into the fuel inlet 2, and 4 a funnel shaped guide for a fuel pump nozzle. A bracket 5 is fixed to the outer wall of the guide 4, and a rotary shaft 6 is rotatably supported by the bracket 5. A closure valve 8 controlling the opening operation of the opening 7 of the guide 4 is firmly fixed to the rotary shaft 4, and thus, when the closure valve 8 is rotated, the rotary shaft 6 is also rotated. A coil spring 9 is fitted around the rotary shaft 6. One of the ends of the coil spring 9 is hooked on the closure valve 8, and the other end of the coil spring 9 is hooked on the bracket 5. The closure valve 8 is continuously biased towards the closed position by the coil spring 9 and, therefore, as illustrated in FIGS. 2 and 3, the closure valve 8 normally closes the opening 7 of the guide 4. As illustrated in FIGS. 2 and 4, the end portion 10 of the rotary shaft 6 is formed into a flat shape.

A valve housing 11 is mounted on the outer wall of the fuel inlet pipe 1. This valve housing 11 comprises a base portion 11a fixed to the outer wall of the fuel inlet pipe 1, and a cover member 11b connected to the base portion 11a. A bracket 12 having a U-shaped cross-section is fixed to the base portion 11a in the interior of the valve housing 11. A cam 13 and a control valve 14 actuated by the cam 13 are arranged in the valve housing 11, and the cam shaft 13a of the cam 13 is rotatably supported by the bracket 12. The cam shaft 13a is coaxially arranged with the rotary shaft 6 of the closure valve 8, and the flat end portion 10 of the rotary shaft 6 is fitted into the slot 15 formed on the end face of the cam shaft 13a. Consequently, when the closure valve 8 is rotated, the cam shaft 13a is also rotated.

The control valve 14 is rotatably supported by a pin 16, which is supported by the bracket 12, and the upper end portion of the control valve 14 is engageable with the cam 13. A circular shaped opening 17 is formed on the lower end portion of the control valve 14, and a valve body 18 is supported in the circular-shaped opening 17 by the control valve 14. The valve body 18 comprises a semi-spherical-shaped enlarged head portion 18a and a reduced diameter portion 18b, and the reduced diameter portion 18b is loosely fitted into the circular-shaped opening 17. A spring retainer 19 is fixed to the tip of the reduced diameter portion 18b, and a compression spring 20 is inserted between the spring retainer 19 and the bracket 12. The distance between the enlarged head portion 18a and the spring retainer 19 is larger than the thickness of the control valve 14 around the circular-shaped opening 17, and thus the valve body 18 can move within the circular shaped opening 17 in the axial direction thereof.

Figure 5:
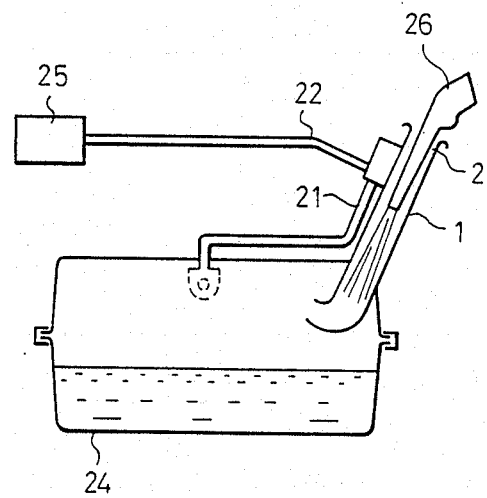
FIG. 5 is a schematically illustrated cross-sectional side view of a fuel tank.

A fuel vapor inlet tube 21 and a fuel vapor outlet tube 22 are open to the interior of the valve housing 11 and are fixed to the cover member 11b. The fuel vapor inlet tube 21 has an inlet opening 21a, and the fuel vapor outlet tube 22 has an outlet opening 23 which can be closed by the valve body 18. As illustrated in FIG. 5, the fuel vapor inlet tube 21 is connected to the upper interior of the fuel tank 24, and the fuel vapor outlet tube 22 is connected to a fuel vapor purifying device, for example, a canister 25 containing charcoal therein. However, instead of connecting the fuel vapor outlet tube 22 to the canister 25, the fuel vapor outlet tube 22 may be directly connected to the intake passage of the engine (not shown) without going through the canister 25. In this case, the engine functions as the fuel vapor purifying device.

As mentioned above, the opening 7 of the guide 4 is normally closed by the closure valve 8. At this time, the outlet opening 23 of the fuel vapor outlet tube 22 is also closed by the valve body 18. Consequently, the fuel vapor in the fuel tank 24 can not escape into the canister 25, and thus the interior of the fuel tank 24 is filled with fuel vapor.

When the replenishment of fuel is carried out, the cap 3 is initially removed and then, as illustrated in FIG. 5, the fuel pump nozzle 26 is inserted into the fuel inlet pipe 1 through the fuel inlet 2. At this time, the tip of the fuel pump nozzle 26 impinges against the closure valve 8, and thus the closure valve 8 is rotated by the fuel pump nozzle 26, causing the opening 7 of the guide 4 to be opened. When the closure valve 8 is rotated, the cam 13 is rotated, and as a result, the control valve 14 is rotated in the counter-clockwise direction in FIG. 1. Therefore, the valve body 18 opens the outlet opening 23 of the fuel vapor outlet tube 22, and thus the fuel vapor in the fuel tank 24 is fed into the canister 25 via the fuel vapor inlet tube 21 and the fuel vapor outlet tube 22.

When the fuel supply from the fuel pump nozzle 26 is started, the fuel spouted from the fuel pump nozzle 26 comes into violent contact with and agitates the fuel in the fuel tank 24, causing bubbles to form in the fuel in the fuel tank 24, and the collapse of these bubbles causes fuel vapor to be generated in the fuel tank 24. This fuel vapor is also fed into the canister 25 via the fuel vapor inlet tube 21 and the fuel vapor outlet tube 22.

When the replenishment of fuel is completed, the fuel pump nozzle 26 is withdrawn from the fuel inlet pipe 1. At this time, both the closure valve 8 and the control valve 14 are closed. Consequently, all of the fuel vapor produced in the fuel tank 24 is fed into the canister 25, and thus it is possible to prevent the fuel vapor from escaping to the outside air. The fuel vapor which is adsorbed by the charcoal of the canister 25 is sucked into the intake passage of the engine via a conduit (not shown) when the engine is in a predetermined operating state.

As mentioned above, only the closure valve 8 is arranged in the fuel inlet pipe 1, and the control valve 14 is arranged in the valve housing 11 which is mounted on the outer wall of the fuel inlet pipe 1. Since the control valve 14 is arranged in the valve housing 11 mounted on the outer wall of the fuel inlet pipe 1 as mentioned above, the control valve 14 can be easily fitted to the fuel inlet pipe 1, and a sufficient fuel vapor flow area can be given to the control valve 14. In addition, since the rotary shaft 6 is connected to the cam shaft 13a in such a way that the flat end portion 10 of the rotary shaft 6 is fitted into the slot 15 of the cam shaft 13a, even if the axis of the rotary shaft 6 is slightly deviated from the axis of the cam shaft 13a, the rotating motion of the rotary shaft 6 can be transferred to the cam shaft 13a. That is, in other words, there is another advantage in that a really high accuracy is not required for the assembly of the rotary shaft 6 and the cam shaft 13a. In addition, since the valve body 18 is loosely fitted into the circular shaped opening 17 and closes the outlet opening 23 of the fuel vapor outlet tube 22 due to the spring force of the compression spring 20, there is a further advantage in that the outlet opening 23 can be firmly closed by the valve body 18.

Figure 6:
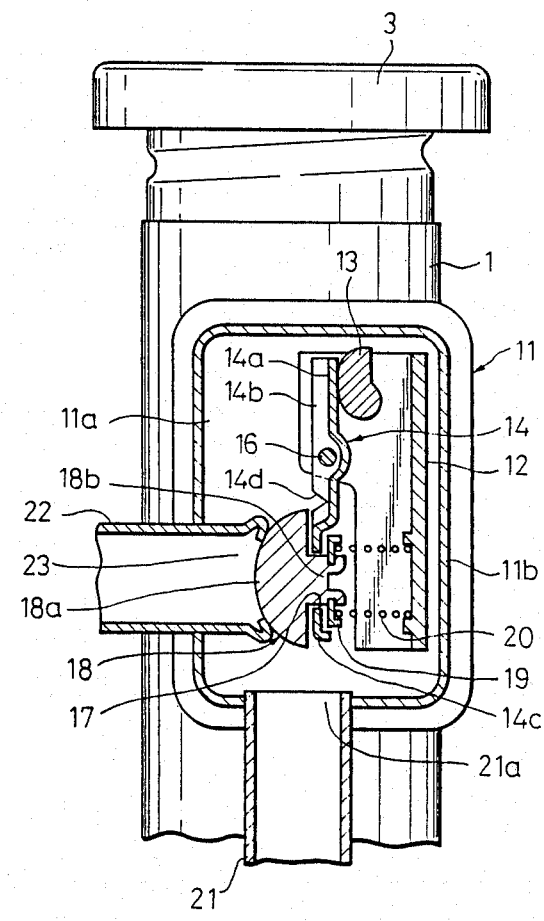
FIG. 6 is a cross-sectional view of a valve housing, illustrating another embodiment of the present invention.
Figure 7:
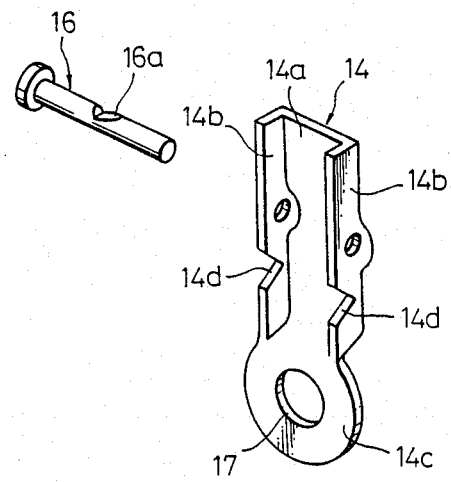
FIG. 7 is a perspective view of the pin and the control valve.

FIGS. 6 and 7 illustrate another embodiment of this invention. Referring to FIGS. 6 and 7, the control valve 14 has a flat plate portion 14a which extends perpendicular to the axis of the pin 16, and a pair of ribs 14b which extend perpendicular to the flat plate portion 14a are formed on the opposed side edges of the flat plate portion 14a. Each of the ribs 14b extends from the upper edge of the flat plate portion 14a to the circular shaped lower end portion 14c of the control valve 14. Cutaway portions 14d are formed on the corresponding ribs 14b midway between the pin 16 and the lower end portion 14c of the control valve 14. These cutaway portions 14d extend from the top faces of the ribs 14b to the flat plate portion 14a. In addition, a cutaway portion 16a is formed in a central portion of the pin 16.

Where the valve housing 11 is mounted on the outer wall of the fuel inlet pipe 1, when an unexpected force acts on both the fuel inlet pipe 1 and the valve housing 11, the valve housing 11 is more easily deformed than the fuel inlet pipe 1. If the valve housing 11 is deformed by such an unexpected force, and as a result, the bracket 12 is deformed, there is a danger that the position of the valve body 18 relative to the outlet opening 23 of the fuel vapor outlet tube 22 will move from the optimum position, and thus it will become impossible to stop the outflow of the fuel vapor from the fuel tank 24 (FIG. 5). However, where the cutaway portions 14d are formed on the ribs 14b of the control valve 14, and the cutaway portion 16a is formed on the pin 16, both the control valve 14 and the pin 16 are easily deformed. Consequently, in this case, even if the unexpected force acts on the valve housing 11, and the bracket 12 is deformed, the control valve 14 and the pin 16 are deformed in a state where the valve body 18 is firmly biased to the outlet opening 23 by the compression spring 20. Therefore, even if the bracket 12 is deformed, the valve body 18 continues to close the outlet opening 23, and thus it becomes possible to prevent the fuel vapor from flowing out of the fuel tank 24.

Figure 8:
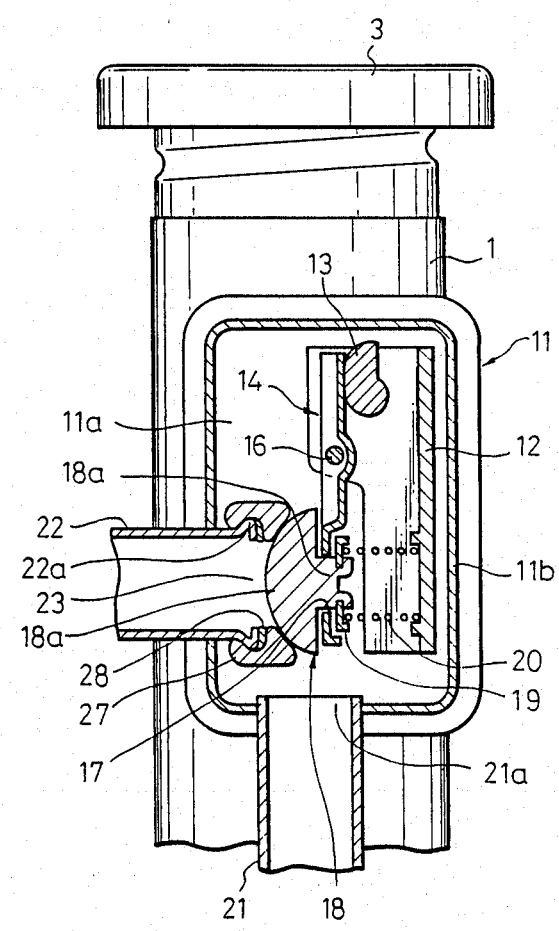
FIG. 8 is a cross-sectional view of a valve housing, illustrating a further embodiment of the present invention.

FIG. 8 illustrates a further embodiment of this invention. In this embodiment, the end portion 22a of the fuel vapor outlet tube 22a around the outlet opening 23 has a curved shape which is formed by bending the end portion 22a inward after bending it outward, and an annular shaped cap 27 made of plastic is fitted around the end portion 22a with a snap-fitting action. This cap 27 is made of, for example, polyamide or polyacetal. A seal ring 28 is inserted between the cap 27 and the end portion 22a. The valve body 18 is made of a metallic material, and the enlarged head portion 18a of the valve body 18 is seated on the cap 27.

In the embodiment illustrated in FIG. 1, it is necessary to machine the end face of the end portion 22a, which comes into contact with the valve body 18, to improve the sealing ability, and thus the manufacturing cost is increased. In addition, where the fuel vapor outlet pipe 22 is welded to the cover member 11b, there is a danger that a thermal distortion of the end portion 22a will occur, reducing the sealing ability. Furthermore, although the sealing ability can be improved by strengthening the spring force of the compression spring 20, if the spring force of the compression spring 20 is strengthened, a greater force is necessary to actuate the closure valve 8 and the control valve 14. However, where the cap 27 made of plastic is fitted onto the end portion 22a, it is not necessary to machine the end portion 22a. In addition, even if thermal deformation occurs in the end portion 22a, and the spring force of the compression spring 20 is weakened, a good sealing can be obtained. Furthermore, since the cap 27 is fitted onto the end portion 22a by a snap-fitting action, the cap 27 can be easily attached to the end portion 22a.

According to the present invention, it is possible to easily mount the control valve on the fuel inlet pipe and give the control valve a large enough fuel vapor flow area.

Although the invention has been described with reference to specific embodiments chosen for the purpose of illustration, it should be apparent that numerous modifications could be made thereto by those skilled in the art without departing from the basic concept and scope of the invention.

We claim:

1. A fuel tank having therein an interior chamber connected to a fuel vapor purifying device, comprising:
   a fuel inlet pipe;
   a rotary shaft rotatably supported within said fuel inlet pipe;
   a closure valve fixed to said rotary shaft and normally closing a cross-section of the fuel inlet pipe, said closure valve being arranged to come into contact with a fuel pump nozzle and rotating to an open position when said fuel pump nozzle is inserted into said fuel inlet pipe;
   a valve housing fixed to an outer wall of said fuel inlet pipe;
   a control valve pivotally supported within said valve housing to control fluid connection between the fuel vapor purifying device and the interior chamber of the fuel tank, said control valve normally disconnecting the interior chamber of the fuel tank from the fuel vapor purifying device; and
   a cam shaft rotatably arranged in said valve housing and connected to said rotary shaft to rotate together with said rotary shaft, said cam shaft having a cam which actuates said control valve to establish a fluid connection between the fuel vapor purifying device and the interior chamber of the fuel tank when said closure valve is open.

2. A fuel tank according to claim 1, wherein said fuel inlet pipe has therein a fuel pump nozzle guide having an opening into which said fuel pump nozzle is inserted, said closure valve being arranged to normally close said opening.

3. A fuel tank according to claim 2, wherein said rotary shaft is rotatably supported by said guide.

4. A fuel tank according to claim 2, wherein said guide has a funnel shape.

5. A fuel tank according to claim 1, wherein said valve housing has a fuel vapor inlet opening connected to the interior chamber of the fuel tank and open to an interior of said valve housing, and said valve housing has a fuel vapor outlet opening connected to the fuel vapor purifying device and open to the interior of said valve housing, said control valve controlling the opening operation of said fuel vapor outlet opening to control the fluid connection between the fuel vapor purifying device and the interior chamber of the fuel tank.

6. A fuel tank according to claim 5, wherein said valve housing comprises a base portion fixed to the outer wall of said fuel inlet pipe, and a cover member covering said base portion, said control valve being pivotally supported by said base portion, said cam shaft being rotatably supported by said base portion, said fuel vapor inlet opening and said fuel vapor outlet opening being formed on said cover member.

7. A fuel tank according to claim 5, wherein said control valve engages with said cam at one end thereof and has a valve body cooperating with said fuel vapor outlet opening at the other end thereof, and said control valve is pivotably supported by a pin at a central portion thereof.

8. A fuel tank according to claim 7, wherein said valve body is loosely fitted into said control valve and has a spring which continuously biases said valve body toward said fuel vapor outlet opening.

9. A fuel tank according to claim 8, wherein said valve body comprises a semi-spherical-shaped enlarged head portion cooperating with said fuel vapor outlet opening, and a reduced diameter portion loosely fitted into an opening which is formed on said control valve.

10. A fuel tank according to claim 8, wherein said valve body is movable in an axial direction thereof relative to said control valve.

11. A fuel tank according to claim 7, wherein said pin is supported by said valve housing at opposed ends thereof and has a cutaway portion formed therein at a central portion thereof.

12. A fuel tank according to claim 7, wherein said control valve comprises a flat plate portion extending from said cam to said valve body, and ribs formed at a substantially right angle or opposed edges of said flat plate portion and extending from said cam toward said valve body, each of said ribs having a cutaway portion which is formed therein and extends to said flat plate portion.

13. A fuel tank according to claim 7, wherein said fuel vapor outlet opening has an annular cap made of plastic and cooperating with said valve body.

14. A fuel tank according to the claim 13, wherein said valve housing has a fuel vapor outlet pipe extending through said valve housing and having an end portion which defines said fuel vapor outlet opening therein, said cap being fitted onto the end portion of said fuel vapor outlet pipe.

15. A fuel tank according to claim 14, wherein the end portion of said fuel vapor outlet pipe comprises an outwardly bending portion and an inwardly bending portion which is bent inwardly from said outwardly bending portion, said cap being fitted onto the end portion of said fuel vapor outlet pipe by a snap fitting action.

16. A fuel tank according to claim 15, wherein a seal ring is inserted between said inwardly bending portion and said cap.

17. A fuel tank according to claim 1, wherein said rotary shaft is coaxially arranged with said cam shaft and mechanically connected to said cam shaft.

18. A fuel tank according to claim 17, wherein said cam shaft has a slot formed on an end face thereof, and said rotary shaft has a flat portion formed at one end thereof and fitted into said slot.

19. A fuel tank according to claim 1, wherein the fuel vapor purifying device comprises a canister containing charcoal therein.

* * * * *